Sept. 16, 1930. R. W. BAKER Re. 17,800

METHOD AND MACHINE FOR LINING AN ARMATURE CORE WITH A FLEXIBLE STRIP

Original Filed March 29, 1926 6 Sheets-Sheet 1

Inventor

Russell W. Baker

By Spencer Sewall & Hardman his Attorneys

Sept. 16, 1930. R. W. BAKER Re. 17,800

METHOD AND MACHINE FOR LINING AN ARMATURE CORE WITH A FLEXIBLE STRIP

Original Filed March 29, 1926 6 Sheets-Sheet 2

Inventor

Russell W. Baker

By Spencer Sewall & Hardman his Attorneys

Sept. 16, 1930. R. W. BAKER Re. 17,800

METHOD AND MACHINE FOR LINING AN ARMATURE CORE WITH A FLEXIBLE STRIP

Original Filed March 29, 1926 6 Sheets-Sheet 3

Inventor

Russell W. Baker

By Spencer Sewall & Hardman his Attorneys

Sept. 16, 1930. R. W. BAKER Re. 17,800
METHOD AND MACHINE FOR LINING AN ARMATURE CORE WITH A FLEXIBLE STRIP
Original Filed March 29, 1926 6 Sheets-Sheet 4
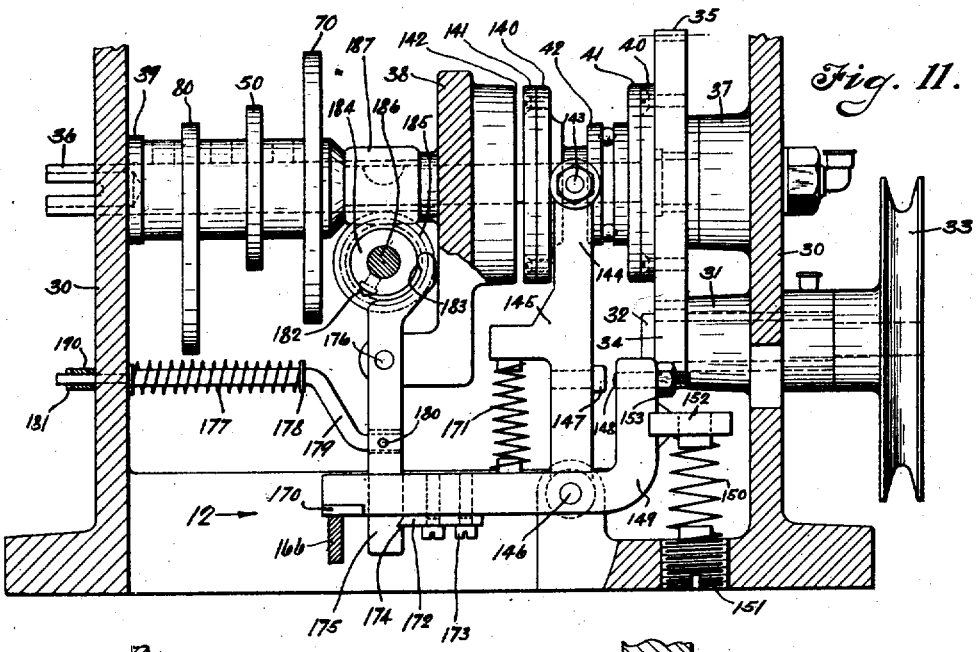
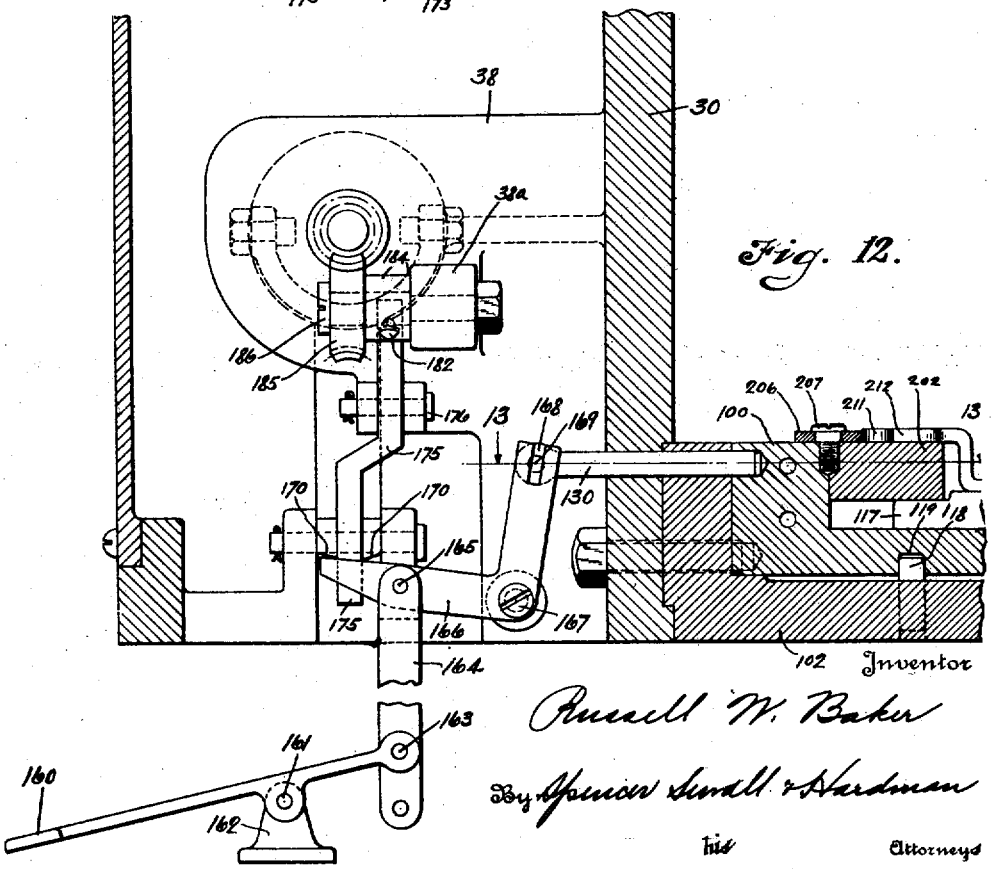
Inventor
Russell W. Baker
By Spencer Sewall & Hardman
his Attorneys Sept. 16, 1930. R. W. BAKER Re. 17,800

METHOD AND MACHINE FOR LINING AN ARMATURE CORE WITH A FLEXIBLE STRIP

Original Filed March 29, 1926 6 Sheets-Sheet 5

Inventor

Russell W. Baker

By Spencer Small & Hardman his Attorneys

Sept. 16, 1930. R. W. BAKER Re. 17,800

METHOD AND MACHINE FOR LINING AN ARMATURE CORE WITH A FLEXIBLE STRIP

Original Filed March 29, 1926 6 Sheets-Sheet 6

Inventor

Russell W. Baker

By Spencer Duvall & Hardman his

Attorneys

Reissued Sept. 16, 1930 Re. 17,800

UNITED STATES PATENT OFFICE

RUSSELL W. BAKER, OF ANDERSON, INDIANA, ASSIGNOR, BY MESNE ASSIGNMENTS, TO DELCO-REMY CORPORATION, OF DAYTON, OHIO, A CORPORATION OF DELAWARE

METHOD AND MACHINE FOR LINING AN ARMATURE CORE WITH A FLEXIBLE STRIP

Original No. 1,661,355, dated March 6, 1928, Serial No. 98,185, filed March 29, 1926. Application for reissue filed January 18, 1930. Serial No. 421,862.

This invention relates to the manufacture of armatures for dynamo-electric machines and particularly to the lining of armature core slots of insulating material preparatory to winding the armature. It has been the practice heretofore to wrap about the armature core a single strip of sheet insulating material which surrounds each of the core teeth and lines the slots between the teeth. After insulating the core in this manner the armature is wound with a number of turns of wire which obviously will retain the slot lining insulating portions of the strip in position. After winding, the insulation is cut at the edge of the core teeth in order to remove those portions of the insulating strip which surround the periphery of each core tooth, thus leaving only those portions which line the core slots.

One of the objects of the invention is to reduce the cost of the operation of wrapping about the armature core a strip of insulating material. The invention is therefore embodied in a machine by which this insulating operation may be carried out with great rapidity.

Further objects and advantages of the present invention will be apparent from the following description, reference being had to the accompanying drawings, wherein a preferred form of embodiment of the present invention is clearly shown.

Figures 7, 8:
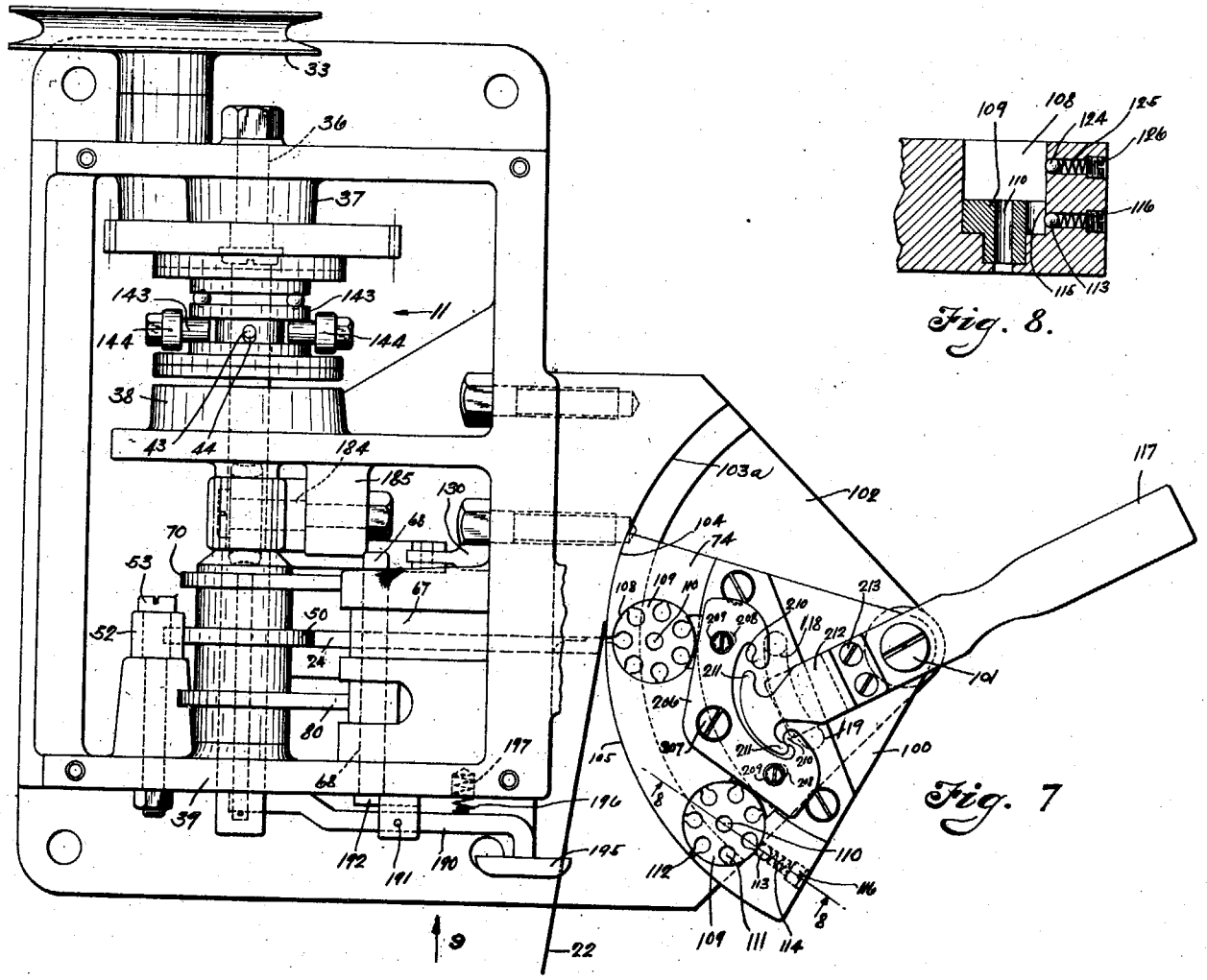
Fig. 7 is a plan view of the machine, a part being broken away for sake of clearness.
Fig. 8 is a sectional view on the line 8—8 of Fig. 7.
Figures 9, 10, 10A:
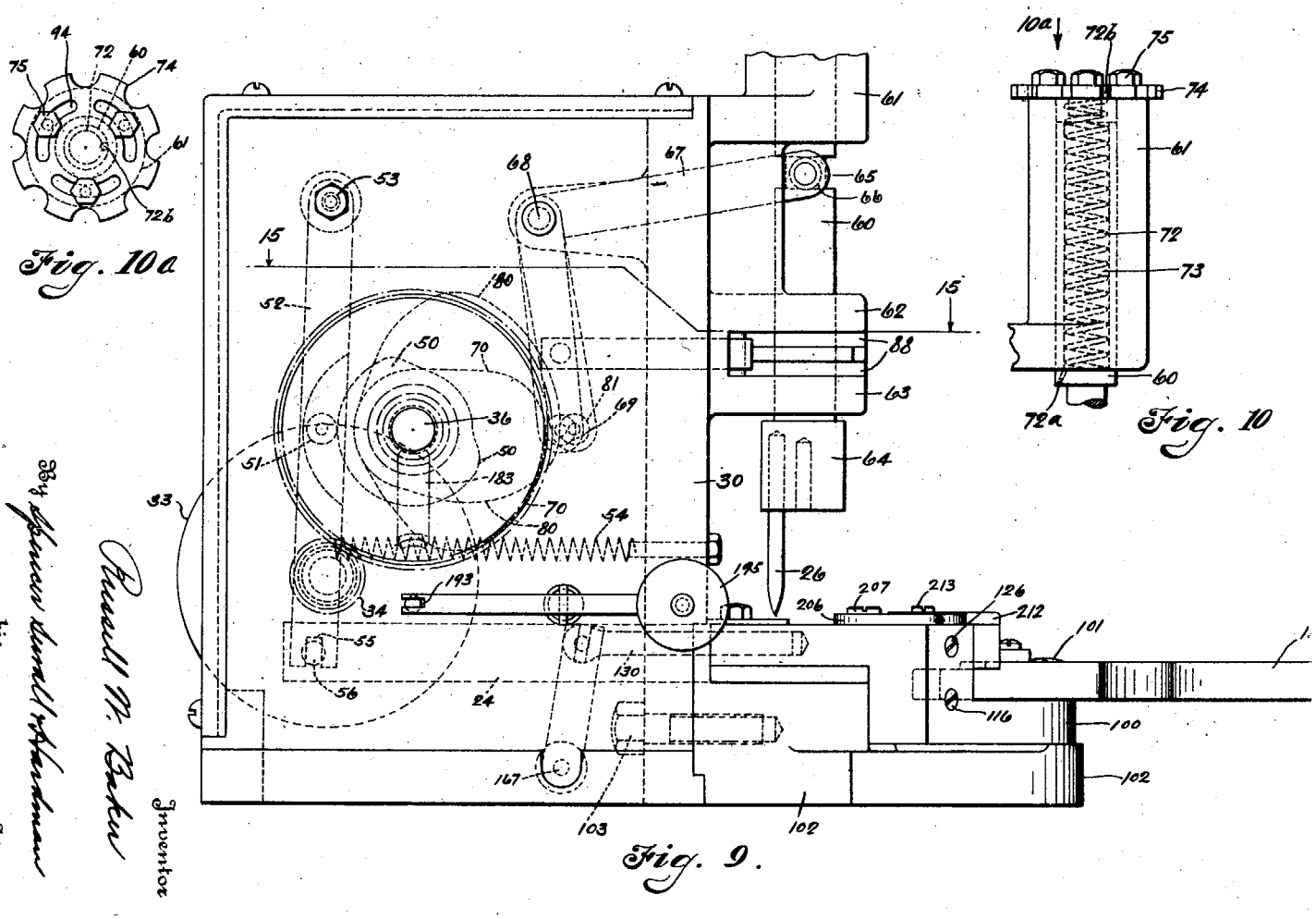

Figs. 9 and 10 together constitute a side view of the machine in the direction of the arrow 9 of Fig. 7.

Fig. 10ª is a view in the direction of the arrow 10ª of Fig. 10.

Fig. 11 is a view of the machine drive shaft and clutch control mechanism looking in the direction of arrow 11 of Fig. 7.

Fig. 12 is a view of clutch control mechanism looking in the direction of arrow 12 in Fig. 11.

Figure 13:
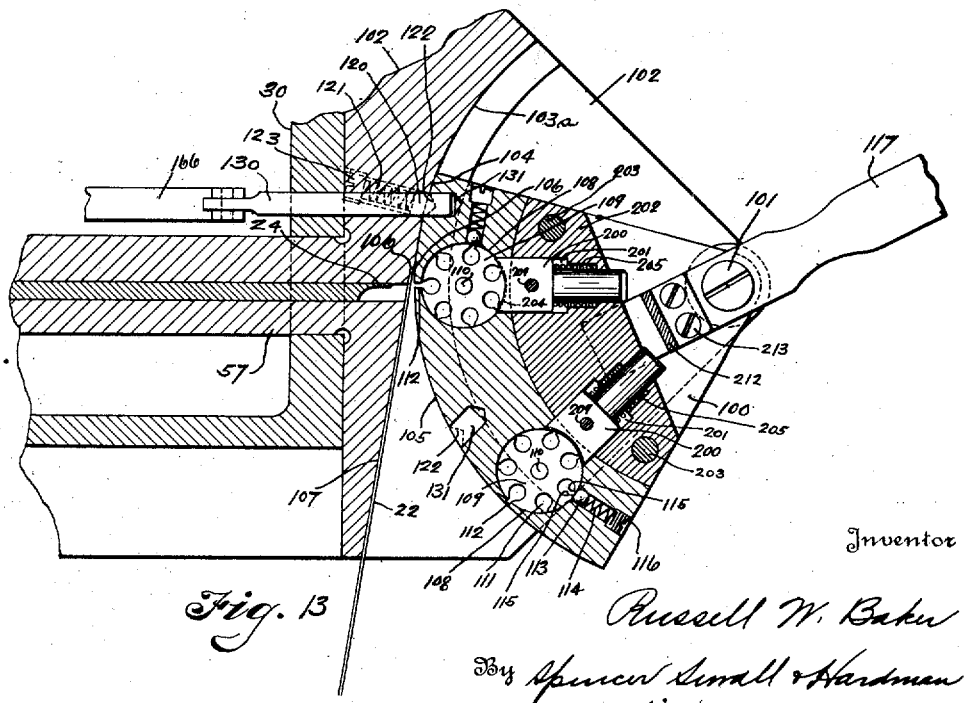

Fig. 13 is a fragmentary sectional view of the machine frame and work carrier taken on the line 13—13 of Fig. 12.

Figure 14:
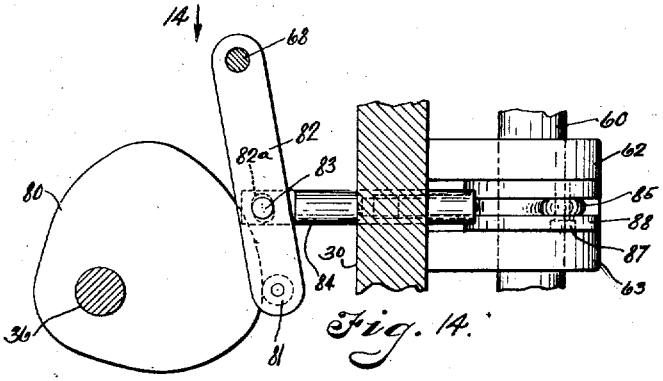

Fig. 14 is a side view of a plunger turning mechanism included in the machine.

Figure 15:
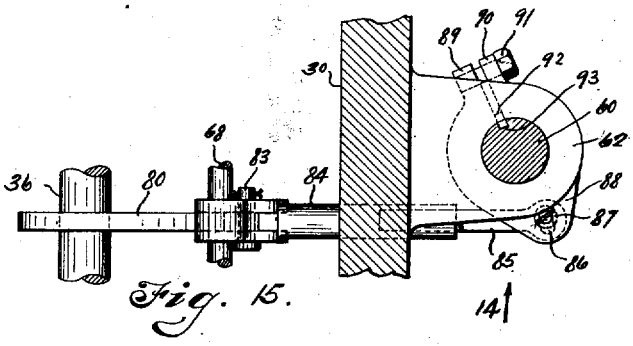

Fig. 15 is a plan view thereof taken on the line 15—15 of Fig. 9.

Figure 16A:
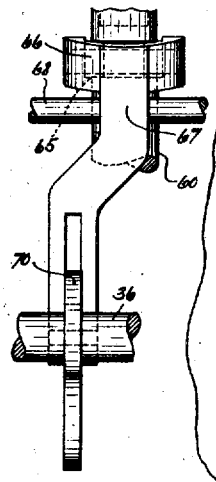
Figure 16:
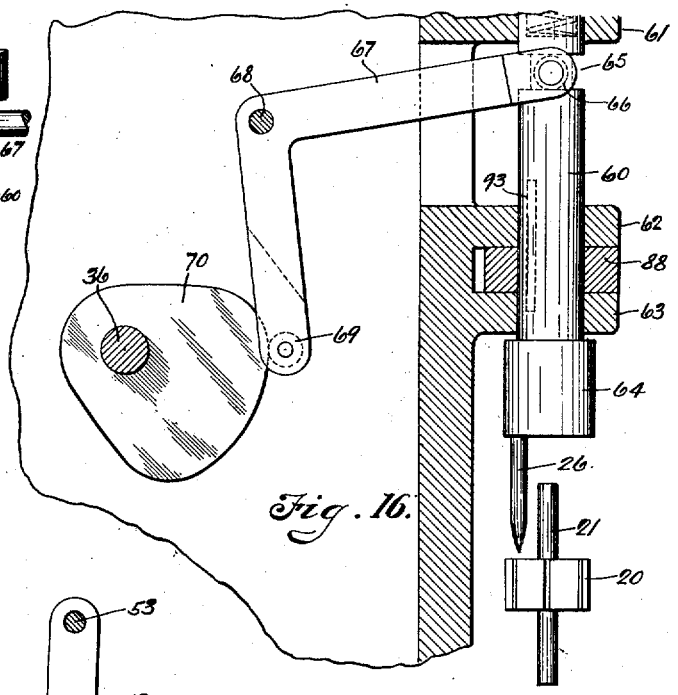

Fig. 16 is a side view of the plunger reciprocating mechanism.

Fig. 16ª is an edge view of the plunger reciprocating mechanism.

Figure 17:
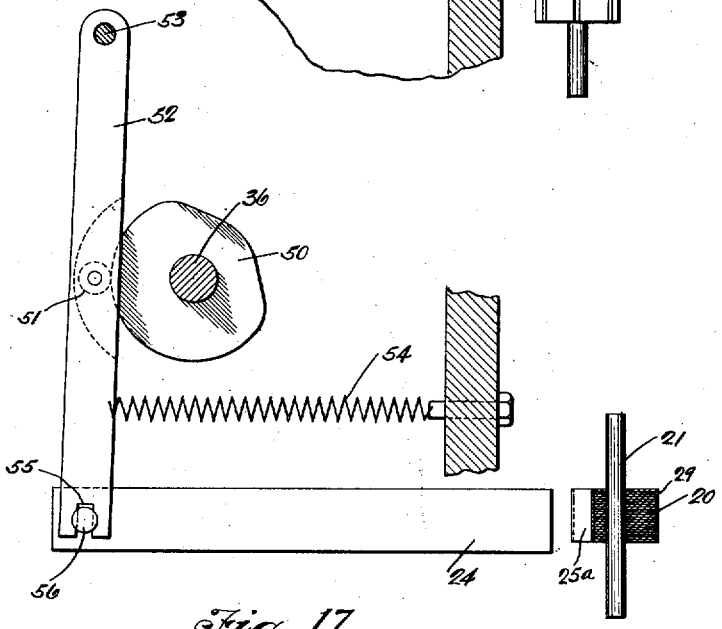

Fig. 17 is a side view of the folding slide operating mechanism.

Figure 1:
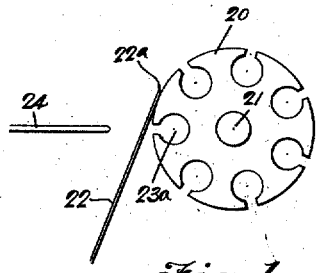
Figs. 1, 2, 3 and 4 are diagrammatic views illustrating the mode of operation of the machine.
Figure 2:
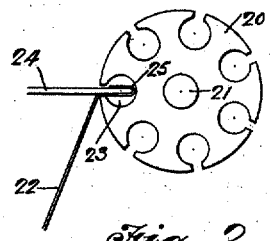
Figure 3:
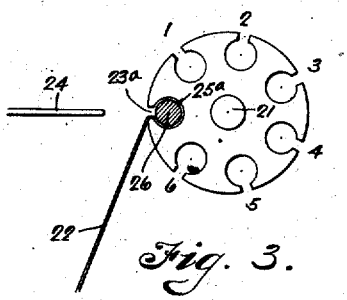
Figure 4:
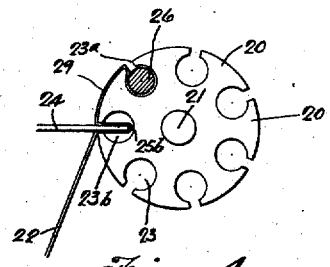
Figure 5:
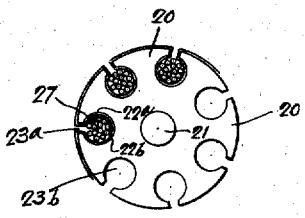
Figs. 5 and 6 illustrate further steps in the manufacture of an armature after having been operated upon by the machine embodying the present invention.

The mode of operation of the machine will be first described with reference to Figs. 1 to 4. In these figures 20 designates a slotted armature core which is attached to an armature shaft 21. The operator places a strip of paper 22 in the position shown in Fig. 1 so that its end 22ª extends beyond the core slot 23 which is the first one to receive the insulation. Then a folding slide 24 is caused to move toward the right until it occupies the position shown in Fig. 2 in order to push the strip 22 into the slot 23. The slide 24 is retracted from the slot 23 leaving a loop 25 of insulation paper within the slot. Then a cylindrical pointed plunger 26 is caused to descend and enter the slot 23 and cause the paper loop 25 to be rounded out as indicated in 25ª of Fig. 3 in order that this loop will conform to the shape of the slot. Then, while the plunger 26 is within the slot 23 and is thus holding the insulating paper in position, the plunger 26 is moved bodily in a clockwise direction about the axis of the shaft 21, thus rotating the core 20 so that the next succeeding core slot 23ᵇ will be moved adjacent to the forming slide 24. While the plunger 26 remains in the slot 23ª and the strip portion 29 surrounding the periphery of an adjacent core tooth is held against said tooth so that said strip will not slip relative to the core, the slide 24 is advanced as before until it forms a second paper loop 25ᵇ in the slot 23[b], as shown in Fig. 4. After the slide 24 is withdrawn, the plunger 26 is withdrawn from the slot 23[a], and is turned back into alignment with the slot 23[b]. Then the plunger 26 descends in order to spread out the paper loop 25[b] so that it will conform to the shape of slot 23[b] while the paper is still clamped to the core tooth periphery. This operation is continued until all of the slots have been lined with insulating paper and the end 22[b] of the strip overlaps the end 22[a] which entered the slot 23[a], as shown in Fig. 5. Necessarily, the paper is fed to the core automatically after one end of it has been located as shown in Fig. 1.

Figure 6:
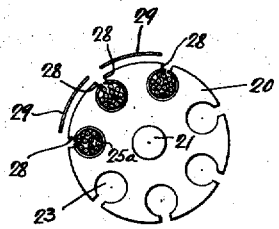

After covering the armature core with a strip of insulating material, windings represented by the small circles 27 in Fig. 5 are applied, and then the paper is cut at the edges 28 of armature core teeth so that the superfluous pieces of paper 29 may be removed, as shown in Fig. 6.

The machine for performing the operations illustrated in Figs. 1 to 4 comprises chiefly a mechanism for reciprocating the slide 24; a mechanism for vertically reciprocating the plunger 26; a mechanism for turning the plunger 26 about an axis in alinement with the axis of the armature shaft 21; a work carrier by which an armature core is transferred from a loading position to an operating position adjacent the folding slide 24; a mechanism for locking the work carrier in operating position as long as the other mechanisms are in operation; and a control apparatus for causing the mechanism to automatically stop after all of the slots have been lined with insulating material.

The machine comprises a main frame 30 which provides a bearing 31 for a shaft 32 carrying a belt driven pulley 33. The shaft 32 operates a gear 34 which meshes with a gear 35 loosely journaled upon a shaft 36 which is supported by bearings 37, 38 and 39. The gear 35 carries a friction clutch disc 40 adapted to cooperate with a clutch disc 41 which is moved sidewise by a grooved collar 42 slidably connected with the shaft 36 by pin and slot connections 43 and 44, (see Fig. 7). When the clutch members 40 and 41 are connected the drive pulley 43 will rotate the shaft 36.

Referring to Figs. 9, 13 and 17, the paper folding slide 24 is operated by a mechanism including a cam 50 which is operated by shaft 36 and which cooperates with a roller 51 attached to lever 52 which is pivoted by screw 53 attached to the machine frame 30. A spring 54, connecting the lever 52 with the machine frame, maintains the roller 51 in engagement with the cam 50. The lower end of lever 52 is provided with a notch which receives a pin 56 attached to the slide 24. The slide 24 is guided by a grooved guide 57 provided by a work holder bracket 102 to be described.

Referring to Figs. 9, 10, 10[a], 16 and 16[a], the mechanism for vertically moving the pointed plunger 26 includes a sliding shaft 60 which is guided by bearings 61, 62 and 63, provided by the machine frame 30. The shaft 60 is in axial alignment with the armature shaft 21 when the armature core 20 is in position for receiving the operations of the machine, and the pointed plunger 26 is carried by the head in such a position that it is adapted to be received by the armature core slots. The sliding shaft 60 is provided with a groove 65 which is adapted to receive rollers 66 carried by a bifurcated bell crank lever 67 which is pivoted upon a rod 68 supported by the machine frame. The lever 67 carries a roller 69 which cooperates with a cam 70 driven by the shaft 36. The roller 69 is urged against the cam 70 by a compression spring 72 which is received by a central recess 73 in the upper end of the shaft 60 which slides within the bearing 61. The spring 72 is located between the bottom of the recess 73 and a plate 74 which is attached by screws 75 to bearing 61.

The mechanism for rotating the shaft 60 is shown in Figs. 14 and 15, and includes a cam 80 which is operated by the shaft 36 and cooperates with a roller 81 connected with a lever 82 which is pivotally supported by the rod 68. The lever 82 has a slot 82[a] which receives a pin 83 attached to a sliding rod 84 having an adjustable extension 85. The extension 85 is provided with a slot 86 which receives a screw 87 attached to a lever 88 which is located between the bearings 62 and 63. The lever 88 includes clamping portions 89 and 90 which cooperate with a clamp screw 91 which passes through a plain hole into part 90 and is threaded into part 89. These parts are held in position by a key 92 which is received by a keyway 93 in the shaft 60. The roller 81 is maintained in engagement with cam 80 by the spring 72 shown in Fig. 10. Besides being a compression spring, spring 72 is a torsion spring having one end 72[a] attached to the shaft 60 adjacent the bottom to the recess 73, and having its other end 72[b] attached to the plate 74. Referring to Fig. 10[a] the plate 74 is provided with arcuate slots 94 which receive the screws 75. When the screws 75 are loosened the plate 74 may be turned to vary the torsional effect produced by the spring 72 upon the shaft 60. By tightening down the screws 75 the plate 74 will be secured in the desired position of adjustment. As viewed in Fig. 14, the cam 80 tends to move the lever 88 in a counterclockwise direction, but the spring 72 is so twisted that it tends to rotate the lever 88 clockwise, thus maintaining the roller 81 in engagement with the cam 80.

A work holder 100 which is circularly segmental in form is pivotally mounted upon screw 101 on a work holder bracket 102 which is secured by screws 103 to the machine frame 30. The bracket 102 is provided with a cylindrical surface 103[a] concentric with the screw 101, and this surface 103[a] receives a cylindrical surface 104 of work holder 100. The work-holder bracket 102 is provided with a shoulder 106 joining the surface 103[a] with surface 107 approximately tangent to the surface 103[a]. This shoulder 106 provides a stop for the insulating paper strip 22 which is guided toward the stop 106 by the surface 107. The work holder 100 is provided with cylindrical recesses 108 each of which receives a solid rotatable block 109, which has the same contour as the armature core which is received by the recess. The block 109 is provided with a central hole 110 adapted to receive the armature shaft 21 and with slots 111 which are adapted to be located in alignment with the slots of the armature core. The side wall of each of the recesses of 108 is provided with an opening 112 leading to the peripheral surface 104. These openings are provided for the purpose of receiving the paper folding slide 24. Each block 109 is rotatable within the recess 108 and is maintained in a certain position by spring pressed ball 113 which is urged by a spring 114 into engagement with the edges of the teeth parts 115 which define the slots 111. A plug 116 maintains the spring 114 in position. The work holder is operated by a handle 117 in order to bring either of the slots 112 opposite the end of the paper folding slide 24. Motion of the work holder 100 is limited in either direction by a pin 118 attached to the bracket 102 and received by an arcuate groove 119 provided in the bottom of the work holder 100. The work holder 100 is yieldingly maintained in either of these positions and accurately located by a plunger 120 which is yieldingly pressed by spring 121 into either of two depressions 122 in the holder. The spring 121 is retained in position by plug 123.

The work holder 100 carries adjacent each recess 108 a spring pressed ball or plunger 124 which is adapted to be received by one of the notches of an armature core 20 which is placed within the recess in order to yieldingly maintain the core slots in alignment with slots 111 of the rotatable block 109. The ball 124 is urged inwardly by a spring 125 which is retained by a plug 126.

The diameter of a recess 108 is greater than the diameter of the core 20 to provide clearance for the insulating strip 22. In order that the core slot, which is operated upon by the plunger 26 will be in alignment therewith and in order that the paper insulation may be yieldingly clamped against a core tooth periphery adjacent said slot, means are provided for urging the armature core being operated upon toward that side of the recess 108 which is nearest the opening 112. Adjacent each recess 108 there is located a slide 200 which is guided by a recess 201 in a guide block 202 attached by screws 203 to the work holder 100. The work holder is provided with a notch 204 leading from each recess 201 into each recess 108 in order that the slide 200 may extend within the recess 108. Each slide 200 is yieldingly urged within a recess 108 by a spring 205. Whenever a recess 108 is moved to an unloading position, its slide 200 is automatically retracted by the manipulation of handle 117; and, by moving a recess 108 to the operating position by manipulation of the handle 117, the spring 205 adjacent that recess is automatically released to urge a slide 200 into that recess so that the armature core to be operated upon will be urged against that side of the recess which is adjacent the passage 112. In this way the core slot next to receive the plunger 26 will be located more nearly in vertical alignment therewith.

The mechanism operated by the handle 117 for automatically controlling the slide 200 comprises a lever 206 pivotally connected by a screw 207 to the work holder 100. The lever 206 is provided with slots 208 each adapted to receive a screw 209 attached to a slide 200. The lever is provided with fingers 210 adapted to be engaged by fingers 211 provided by bracket 212 attached by screws 213 to the handle 117 which is pivoted upon the screw 101, but not directly connected with the work holder 100. Movement of handle 117 in a counterclockwise direction, for example, in order to move the upper recess 108 (as viewed in Fig. 7) to operating position will cause the lever 206 to move counterclockwise so that the upper slot 208 will be so moved relative to the upper screw 209 as to permit the upper spring 205 to move the upper block 200 toward the left. At the same time the lower slot 208 will be moved toward the fulcrum screw 201 so that said slot will engage the lower screw 209 in order to retract the lower block 200 from the lower recess 208. It is obvious that movement of lever 117 in a clockwise direction to move the lower recess 108 (as viewed in Fig. 7) to loading position, and the upper recess 108 to unloading position, will permit the lower slide 200 to enter the lower recess and the upper slide 200 to be withdrawn from the upper recess.

The work holder 100 is maintained in either of its positions with either of the recesses 108 opposite the slide 24 while the machine is in operation by mechanism which includes a slide 130 guided by the frame 30 and bracket 102 and adapted to be received by either of two cylindrical recesses 131 provided by the work holder 100. The slide 130 is controlled by the mechanism which also controls the starting and stopping of the machine.

When the machine shaft 36 is at rest the clutch shifting member 42 will be moved to the left of the position shown in Fig. 11 so that clutch member 41 will be disengaged from the clutch member 40. The member 42 is provided with a flange to which is secured a brake disk 141 which, in the rest position of the machine, is caused to bear yieldingly against a stationary brake surface provided by bearing 38. The grooved collar 42 receives pins 143 carried by the members 144 of a bifurcated shifting lever 145 which is pivoted at 146 upon the machine frame. The lever 145 carries a stud 147 which is adapted to be engaged by a screw 148 which is adjustably carried by a lever 149 which is also supported by the pin 146. Normally the lever is urged in a counterclockwise direction by spring 150 bearing against a plug 151 attached to the machine frame and against a lug 152 forming a part of lever 149. The screw 148 is secured in adjusted position by a nut 153. Normally the spring 150 causes the lever 149 to move so that the screw 148 will engage the stud 147 to cause the lever 145 to move counterclockwise so that the brake disk 141 will be yieldingly urged into contact with the brake member 142. In this way the machine is brought quickly to rest after the clutch members 141 and 140 are disengaged.

To engage the clutch members 40 and 41 the operator depresses a pedal 160 which is pivoted at 161 upon a bracket 162 and which is attached at 163 to a link 164. Link 164 is attached by pin 165 to a bell crank lever 166 which is fulcrumed upon a screw 167 attached to the machine frame. Lever 166 is provided with a notched end 168 which receives a pin 169 connected with the locking slide 130. Obviously when the pedal 160 is moved in a counterclockwise direction, as viewed in Fig. 12, the bell crank lever 166 will be moved clockwise and the slide 130 will be shifted so as to be received by one of the recesses 131 in the work holder 100 so as to prevent movement of the work holder while the machine is in motion.

During the motion of pedal 160 described, the lever 166 engages the end 170 of the lever 149 and will cause it to move in a clockwise direction as viewed in Fig. 11. This movement of the lever 149 will cause the lever 145 to move toward the right and the clutch member 141 to be yieldingly pressed against the clutch member 140 due to a spring 171 which transmits motion in one direction between the levers 149 and 145. When the clutch members are engaged, as shown in Fig. 11, the lever 149 will be latched in this position by virtue of the engagement of a latch plate 172, attached by screws 173 to the lever 149, with a shoulder 174 provided by a latching lever 175 which is pivoted at 176 upon the machine frame. The latching lever is urged in a counterclockwise direction by a spring 177 bearing at its left end against the machine frame 30 and at its right end against a collar 178 carried by a rod 179. The rod 179 is attached at 180 to lever 175 and its left end slides through the machine frame and carries a pin 181. The latching lever 175 is controlled by a rotatable camming stud 182 which is adapted to engage the end 183 of lever 175 and to move the lever in a clockwise direction in order to disengage it from the latch 172. This camming stud 182 is attached to the hub 184 of a gear 185 which is mounted upon a stub shaft 186 attached to a bracket 38ᵃ extending from the bearing bracket 38 (see Figs. 7 and 12). The gear 185 meshes with a gear 187 attached to the shaft 36. These gears have a ratio depending upon the number of slots in the armature core. For example, if the core has seven slots it is desirable that the machine performs eight operations before stopping so that the first slot receiving the insulation will receive the slide and the plunger again before the machine stops. This is necessary in order that the ends 22ᵃ and 22ᵇ of the insulation strip will overlap one another as shown in slot 23ᵃ in Fig. 5. Therefore, if the core has seven slots the ratio of gears 187 and 185 is 1 to 8. That is, the gear 187 will rotate eight times to produce one revolution of gear 185. When the machine has performed the required number of cycles to line all of the core slots and to cause the ends of the insulating strip to overlap in the first slot to receive insulation (slot 23ᵃ in Fig. 5), the machine will be stopped automatically due to the engagement of the cam 182 with the lever end 183. As soon as the latch lever 175 is released from the plate 172, the lever 149 will be urged in a counterclockwise direction by the spring 150, and the brake members 141 and 142 will be engaged so that the machine will stop promptly.

In order to stop the machine at any time before its predetermined number of cycles have been completed there is provided a hand lever 190 which is pivoted upon a pin 191 carried by a bracket 192 attached to the machine frame. The left end of the lever 190, as viewed in Fig. 9, is provided with a notch 193 which receives the rod 179, and the end of lever engages the pin 181. By pressing a handle 195 carried by the lever 190 toward the machine the rod 179 will be moved toward the left, as viewed in Fig. 11, in order to withdraw the lever 175 from the latch plate 172. The handle 195 is urged away from the machine by a spring 196 located between the lever 190 and the machine frame and received by a recess 197.

To use the machine, the operator will place an armature core within one of the recesses 108 of the work holder 100, and will turn the core until one of the core slots is engaged by the ball 124. Then the work holder is moved so that the loaded recess will be located opposite the slide 24. Then the operator will move the pedal 160 counterclockwise, as viewed in Fig. 12, in order to lock the work holder in the desired position and to cause the machine to function in the manner described. The cams 60, 70 and 80 are so constructed and timed to produce the movements of the slide 24 and the plunger 60 as described with reference to Figs. 1 to 4. During one cycle of movements of the slide 24 and plunger 60 the paper strip is pushed into a slot by the slide to form a narrow loop which is spread out by the plunger and while the plunger is received by the slot then being lined, it is bodily rotated about the axis of the supporting block 109 in order to move the core the angular distance between the core slots. During the next cycle, the slide 24 enters the succeeding slot while the paper is clamped into position within the preceding slot by the plunger which is still located within it, and while the paper is clamped against the periphery of the preceding adjacent core tooth due to the operation of the spring pressed slide 200. Thus the paper strip is fed automatically by the operation of the slide in pushing a loop of paper into the slot. Then, after the slide 24 has been withdrawn from the succeeding slot and while the paper strip is clamped between the recess wall and an adjacent core tooth periphery, the plunger 26 is operated to spread out the loop just formed by the slide. As the loop is spread out by the plunger, more of the paper strip is fed into the slot then being lined.

While the machine is in operation the operator will load the recess 108 which is more remote from the slide 24. At the end of the predetermined number of operations of the machine, the machine will stop automatically and the slide 130 will be withdrawn automatically so that the work holder may be moved into another position to bring the non-insulated core therein into position for operation by the machine and to bring the insulated core into position for unloading. Unless the work holder 100 is in one of its positions referred to in which the plunger 130 is aligned with one of the recesses 131, the machine cannot be started. In any other position of the work holder movement of the plunger 130 toward the right in Fig. 12 would be obstructed, hence the pedal 160 can not then be operated to cause the clutch members 40 and 41 to be engaged.

While the form of embodiment of the present invention as herein disclosed, constitutes a preferred form, it is to be understood that other forms might be adopted, all coming within the scope of the claims which follow.

What is claimed is as follows:

1. The method of lining an armature core with a flexible strip of insulating material, which includes pushing the strip into the core in a direction transverse to the core axis to form a narrow loop of material within the core, introducing a suitable tool into the end of the slot and narrow loop, moving the tool endwise of the core to cause the loop to be spread out and to conform to the side walls of the teeth defining the slot, and pushing a loop of material into a succeeding slot while the tool remains within the preceding slot.

2. The method of lining an armature core with a flexible strip of insulating material, which includes pushing the strip into the core in a direction transverse to the core axis to form a narrow loop of material within the core, introducing a suitable tool into the end of the slot and narrow loop, moving the tool endwise of the core to cause the loop to be spread out and to conform to the side walls of the teeth defining the slot, and pushing a loop of material into a succeeding slot while the material is clamped against the periphery of an adjacent core tooth.

3. A machine for lining an armature core with a flexible strip of insulating material, comprising, in combination, a core holder, means for introducing a loop of paper into a core slot, and means for spreading the loop to cause it to engage the sides of the core teeth defining the slot.

4. A machine for lining an armature core with a flexible strip of insulating material, comprising, in combination, a core holder; a member movable transversely of the core for pushing a portion of the strip into a core slot to form a loop therein; a member movable axially of the core for entering the slot and loop to force the loop into engagement with the walls of the core; and mechanism for automatically operating the members and for moving the core progressively into different operating positions.

5. A machine for lining an armature core with a flexible strip of insulating material, comprising, in combination, a core holder; a slide movable transversely of the core for pushing a portion of the strip into a core slot to form a loop therein; a pointed plunger movable axially of the core for entering the slot and loop to force the loop into engagement with the walls of the core; and mechanism for causing in recurrent sequence the slide to enter into and withdraw from a slot, the plunger to enter said slot, the plunger then to be rotated bodily about the axis of the core while still within said slot in order to move the core into the next operating position, and the plunger then to be withdrawn from said slot and to be rotated bodily to position in alinement with the next succeeding slot to be operated upon.

6. A machine for lining an armature core with a flexible strip of insulating material, comprising, in combination, means for introducing a loop of paper into a core slot; and means for spreading the loop to cause it to engage the sides of the core teeth defining the slot; a work holder having a recess for receiving a core and the insulation which covers the core tooth peripheries, and adapted to receive the loop-forming means and the loop-spreading means; a device for urging a core yieldingly toward one side of the recess in order to clamp the strip between the recess wall and a core tooth; and means for operating said loop-forming means and said loop-spreading means and for rotating the care within the recess.

7. A machine for lining an armature core with a flexible strip of insulating material, comprising, in combination, means for introducing a loop of paper into a core slot; and means for spreading the loop to cause it to engage the sides of the core teeth defining the slot; a work holder having a recess for receiving a core and the insulation which covers the core tooth peripheries, and adapted to receive the loop-forming means and the loop-spreading means; a work holder having a plurality of recesses each for receiving a core and the insulation strips placed about it and adapted to move the cores successively from loading position to a position for operation by the machine, each recess, when in the machine operating position, being adapted to receive the loop forming means and the loop spreading means; a device adjacent each recess for urging a core yieldingly toward one side of the recess in order to clamp the strip between the recess wall and a core tooth; means for moving the work holder and for causing each of said devices to be inoperative when the recess with which the recess with which the device cooperates is in loading position; and means for operating said loop-forming means and said loop-spreading means and for rotating the core within the recess.

8. A machine for lining an armature core with a flexible strip of insulating material, comprising, in combination, means for introducing a loop of paper into a core slot; and means for spreading the loop to cause it to engage the sides of the core teeth defining the slot; a work holder having a recess for receiving a core and the insulation which covers the core tooth peripheries, and adapted to receive the loop-forming means and the loop-spreading means; a work holder having a plurality of recesses each for receiving a core and the insulation strips placed about it and adapted to move the cores successively from loading position to a position for operation by the machine, each recess, when in the machine operating position, being adapted to receive the loop-forming means and the loop-spreading means; power operated means for operating the loop-forming means and the loop-spreading means and for rotating the core within the recess; and control means operable to connect said last means with a source of power only when the work holder is in position to locate a core in position for operation by the machine.

9. A machine such as defined by claim 8, in which the operation of the control means to connect the power operated means with a source of power, also effects the movement of a device for locking the work-holder until the machine stops.

10. A machine for lining an armature core with a flexible strip of insulating material, comprising, in combination, means for introducing a loop of paper into a core slot; and means for spreading the loop to cause it to engage the sides of the core teeth defining the slot; a work-holder having a recess for receiving a core and the insulation which covers the core-tooth peripheries, and adapted to receive the loop-forming means and the loop-spreading means; a work-holder having a plurality of recesses each for receiving a core and the insulation strip placed about it and adapted to move the cores successively from a loading position to a position for operation by the machine, each recess, when in the machine-operating position, being adapted to receive the loop forming means and the loop-spreading means; power-operated means for operating the loop-forming means and the loop-spreading means and for rotating the core within the recess; and means for stopping the machine automatically after all of the slots of a core have been lined with insulation.

11. A machine for lining an armature core slot which comprises, in combination a core holder, means for introducing insulating sheet material into the slot and means for engaging the material while in the slot to cause it to conform to the core slot.

12. A machine for lining an armature core slot which comprises, in combination, a core holder, means for introducing a loop of insulating sheet material between the core teeth into the slot, and means for spreading the loop to cause it to conform to the core slot.

13. A machine for lining an armature core slot which comprises, in combination, a core holder, means for introducing a loop of insulating sheet material between the core teeth into the slot, and a tool insertable endwise into a core slot to cause the material to conform to the core slot.

14. A machine for lining an armature core slot which comprises, in combination, a core holder, means for introducing a loop of insulating sheet material between the core teeth into the slot, means for spreading the loop to cause it to conform to the core slot and means for indexing the core relative to the introducing means whereby a succeeding core slot may be lined.

15. A machine for lining an armature core slot which comprises, in combination, a core holder, means for introducing a loop of insulating sheet material between the core teeth into the slot, means for spreading the loop to cause it to conform to the core slot, and means including the loop spreading means, for indexing the core relative to the introducing means whereby a succeeding core slot may be lined.

16. A machine for lining an armature core slot which comprises, in combination, a core holder, means for introducing a loop of insulating sheet material between the core teeth into the slot, means for spreading the loop to cause it to conform to the core slot, means for indexing the core for lining of succeeding slots, and means for causing the machine to stop after all of the slots have been lined.

17. The method of lining an armature core with insulating material, which includes pushing a strip of material into the core in a direction transverse to the core axis to form a narrow loop of material within the core, introducing a suitable tool into the end of the slot and narrow loop, moving the tool endwise of the core to cause the loop to be spread out and to conform to the side walls of the teeth defining the slot, and pushing a strip of material into a succeeding slot while the tool remains within the preceding slot.

18. A machine for lining an armature core with a flexible strip of insulating material, comprising, in combination, a core holder, means for introducing a strip of paper into each core slot, and means for expanding the strip so introduced to cause it to engage the sides of the core teeth defining the slot.

In testimony whereof I hereto affix my signature.

RUSSELL W. BAKER.